N. A. LOCKE.
INSTRUMENT FOR COMPARING RELATIVE POSITIONS OF CENTERS.
APPLICATION FILED JULY 2, 1912.

1,232,701.

Patented July 10, 1917.
2 SHEETS—SHEET 1.

N. A. LOCKE.
INSTRUMENT FOR COMPARING RELATIVE POSITIONS OF CENTERS.
APPLICATION FILED JULY 2, 1912.
1,232,701.
Patented July 10, 1917.
2 SHEETS—SHEET 2.
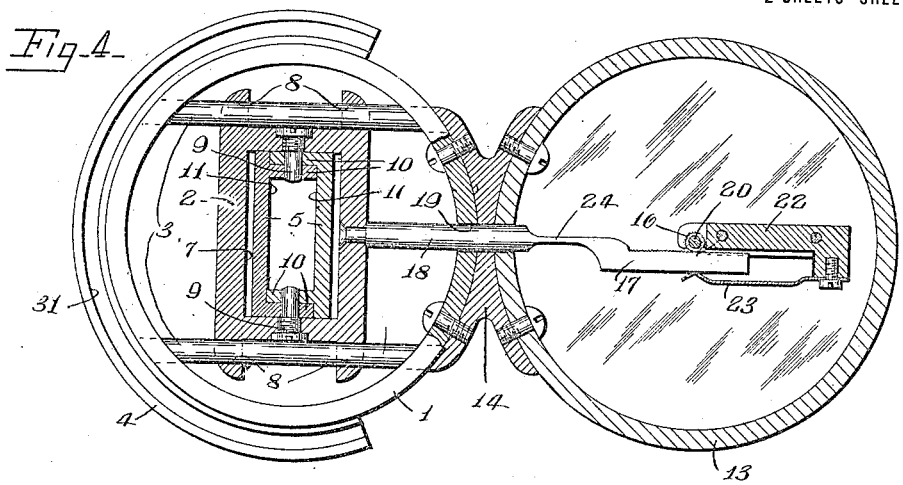
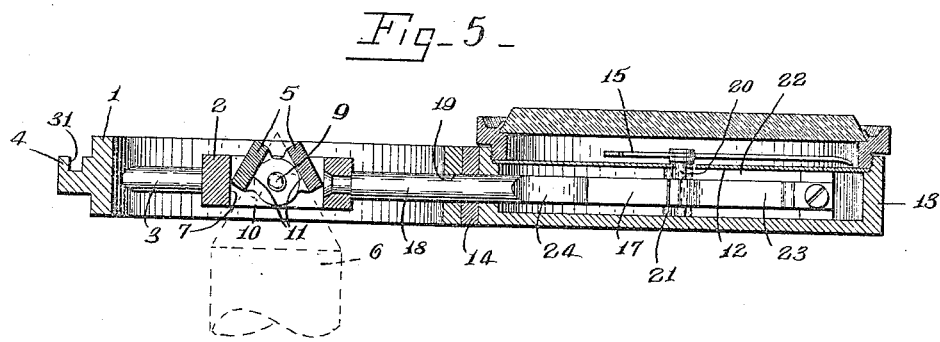
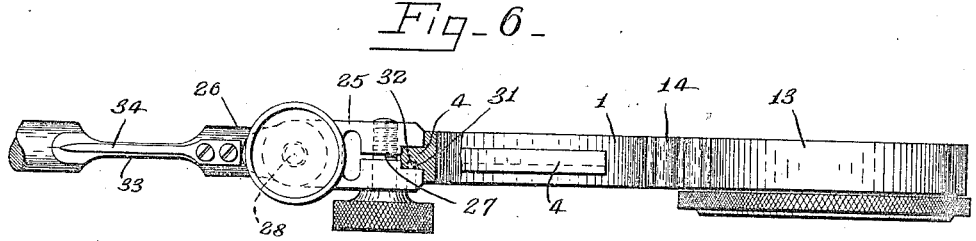
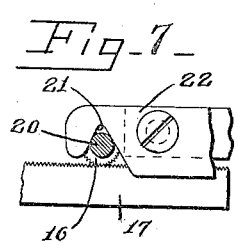
WITNESSES:
Chas. H. Young
S. Davis
INVENTOR
Nathen A. Locke
BY
Parsons Hall Bodell
ATTORNEYS

UNITED STATES PATENT OFFICE.

NATHEN A. LOCKE, OF FULTON, NEW YORK.

INSTRUMENT FOR COMPARING RELATIVE POSITIONS OF CENTERS.

1,232,701.                     Specification of Letters Patent.     Patented July 10, 1917.

Application filed July 2, 1912. Serial No. 707,183.

*To all whom it may concern:*

Be it known that I, NATHEN A. LOCKE, of Fulton, in the county of Oswego, in the State of New York, have invented a certain new and useful Instrument for Comparing Relative Positions of Centers, of which the following is a specification.

My invention has for its object the production of an instrument for comparing the relative positions of centers, which is particularly simple in construction and highly efficient and durable in use; and to this end it consists in the novel combinations, constructions and arrangements of parts hereinafter set forth and claimed.

In describing this invention, reference is had to the accompanying drawing in which like characters designate corresponding parts in all the views.

Figs. 4 and 5 are longitudinal sectional views taken at a right angle to each other through the body of the instrument.

Fig. 6 is an edge view, partly in section, of the body and contiguous parts of the instrument.

Fig. 7 is a detail view of the bearing for the gear wheel associated with the indicator or hand, contiguous parts being also shown.

Figure 1:
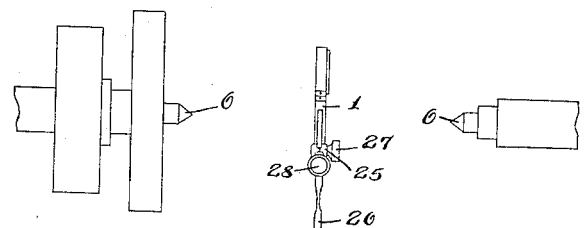
Figures 1 and 2 are diagrammatic views showing my instrument as applied respectively to a lathe and a grinder.

This instrument comprises a body 1, a detecting member 2 supported by the body, indicating means operated by the movement of the detecting member, and a support for the body.

The body 1 may be of any desirable form, size and construction, and is here shown as comprising a ring-shaped part formed with parallel guides as rods 3 arranged within the ring-shaped part, and with a peripheral guide-rib 4. The detecting member is supported in the ring-shaped part and is movable rectilinearly along the rods 3. Said member comprises oppositely arranged engaging parts 5 coacting with inclined sides of the tapered end of a spindle or center at opposite sides of the longitudinal axis thereof and movable automatically relatively to said member, crosswise of the direction of the rectilinear movement thereof, for adjusting said parts to the contour of the end of the spindle or center 6.

Figure 3:
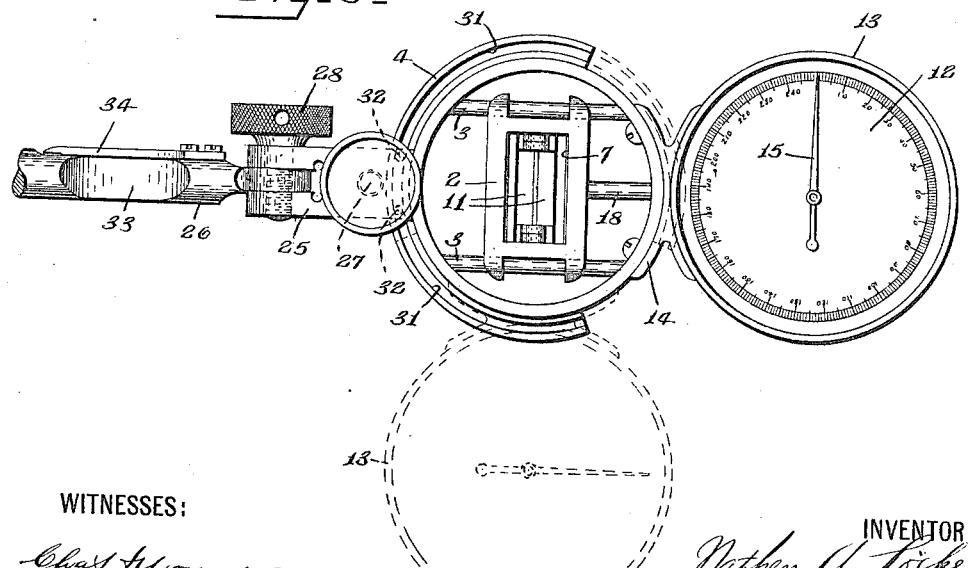
Fig. 3 is an elevation, partly broken away, of my instrument.

In the illustrated exemplification of my invention, the detecting member comprises a block having an opening 7 therethrough and passages 8 for receiving the guides 3; and the engaging parts 5 are pivoted to said member by pivots 9 common to both of said parts 5 and are arranged in the opening 7, and as seen in Figs. 3, 4 and 5, each engaging part 5 consists of opposing bearings 10 and a contact-face 11 between the bearings, said bearings engaging the pivots 9.

It will be apparent that while a spindle or center 6 is being moved in contact with the faces 11 (or in case the spindle or center is fixed, while the instrument is being moved to contact said faces 11 with a spindle or center 6) the engaging parts 5 are adjusting themselves on their pivots 9 to the tapered end of the spindle or center 6, and the detecting member 2 is being moved rectilinearly until both the faces 11 lie flatwise on the tapered end of the spindle or center 6, Fig. 5.

The indicating means consists of a dial 12 supported in a case 13 which is secured to the body 1 by a bracket 14, and a pivoted hand or indicator 15 having a part as a wheel 16 associated therewith and movable about an axis, the wheel being here shown as having fine gear teeth. Said wheel 16 coacts with a part as a rack 17 provided on the end of an arm 18 movable rectilinearly with the block forming the main body of the detecting member 2 and extending laterally therefrom in the direction of its movement and at a right angle to the axis of the pivots 9 and the spaced apart opposing surfaces 11 of the engaging parts 5. As seen in Figs. 3, 4 and 5, said arm 18 is rigidly secured to said main body of the member 2 and slides through a radial passage 19 in the ring-shaped body 1, case 13 and interposed bracket 14.

As seen in Fig. 7 the axle 20 of the indicator 15 and wheel 16 is arranged in a V-shaped bearing 21 formed in a bearing block 22 in the case 13 and is held in the bearing by the rack 17. Owing to the V-shaped bearing 21, the axle bears at three points only and any wear is taken up without disturbing the relation of the scale and indicator 15.

Preferably a spring 23 acts on the rack 17 to hold the same in engagement with the gear teeth, said spring also acting as a friction brake to hold the hand 15 in the position to which it is moved by the member 2 and also to press the rack 17 against the wheel 16 and hold the axle 20 in the V-shaped bearing 21 and automatically take up for wear.

The arm 18 which is rigid with the block of the member 2 is formed with a resilient portion 24 which permits the rack to yield under pressure of the spring 23. This connection is particularly advantageous in that the motion of the detecting member 2 is transmitted without loss to the indicator 15.

As illustrated, the support for the body consists of two sections 25, 26, the section 25 having a clamp 27 for engaging the guide-rib 4 of the body, and the section 26 being a rod hinged to the section 25 by a joint 28, the axis of which is arranged at a right angle to the axis of movement of the body when being moved in the clamp 27. This feature is particularly advantageous as it permits the instrument to be readily applied to a lathe, Fig. 1, or a grinding machine, Fig. 2. When used for comparing the positions of the centers of the lathe, the support is attached to the tool post 29 and the body 1 and sections 25, 26 of the support are alined. When the instrument is attached to a grinder, the body 1 of the instrument may be swung about the axis of the joint 28 connecting the support sections 25, 26 into a position at substantially a right angle to the axis of the rod 26 which is attached to the arbor 30 of the grinder, this arbor being usually arranged at an angle to the axis of the spindles 6 which are on a movable carriage as will be understood by those skilled in the art.

The guide rib 4 and clamp 27 are usually formed with interfitting means as a groove 31 in the side of the rib, Figs. 3 and 6, and a tongue 32 on the clamp extending into and fitting the groove.

As seen in Figs. 3 and 6, the section 26 is provided with a resilient portion 33 for yielding when all the contact-faces 11 are snugly engaged with the tapered end of a spindle or center 6, and with an indicator 34 extending across said resilient portion 33.

Figure 2:
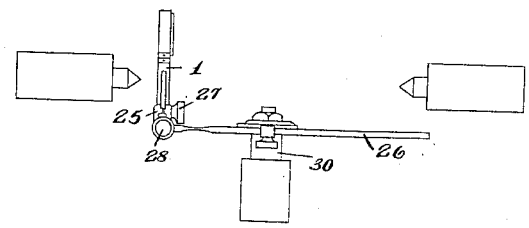

When being used for comparing the horizontal alinement of centers, my instrument is arranged, as shown in Figs. 1, 2 and 3 with the contact-faces 11 of the engaging parts 5 disposed in substantially vertical position and engaged with the tapered end of the standard spindle or center, and the position of the indicator 15 noted. The instrument is then moved, or in case the spindles 6 are movable, the spindles are moved, until all of the contact-faces 11 snugly engage the end of the other spindle or center, and the position of the indicator 15 noted. The difference between the positions of the indicator 15 when locating the position of the first or standard spindle and when locating the position of the second spindle, shows to what extent the second spindle is out of horizontal alinement with the first or standard spindle. When comparing the vertical alinement of centers, my instrument is used in the same way as when comparing the horizontal alinement, but the body 1 is moved relatively to its support along the clamp 27 until the contact-faces 11 are in substantially horizontal position. Among the various uses to which my instrument may be put, is determining to what extent one spindle or center is out of alinement by comparing the position of its end with that of the end of an extension of said spindle attached thereto by an ordinary chuck or otherwise.

My instrument is particularly advantageous in that owing to the pivoted engaging parts 5, it is not necessary to position the body accurately relatively to the centers as the parts 5 adjust themselves to fit the spindle or center while movement is being transmitted to the detecting member 2.

What I claim is:

1. In an instrument for comparing the relative positions of centers, a body formed with guiding means, a detecting member slidable rectilinearly along said means, and having means for engaging the inclined sides of a tapered end of a center at opposite sides of the longitudinal axis of the center, and indicating means operated by the movement of the detecting member, substantially as and for the purpose described.

2. In an instrument for comparing the relative positions of centers, a body, a detecting member carried by the body and reciprocally movable relatively thereto, spaced apart members carried by the detecting member and movable relatively thereto, opposing surfaces of said members coacting with inclined sides of the tapered end of a center at opposite sides of the longitudinal axis of the center, indicating means carried by the body and movable relatively thereto and means connecting the indicating means and the detecting member, substantially as and for the purpose set forth.

3. In an instrument for comparing the relative positions of centers, a body, a detecting member carried by the body and constrained to rectilinear movement relatively thereto, spaced apart substantially parallel contact members carried by the detecting member, said contact members having opposing flat faces at an angle to one another and to the direction of movement of the detecting member and arranged to coact with opposite inclined sides of the tapered end of the center against which they are placed, the contact members being pivotally mounted on the detecting member so as to be movable independently of each other to change the angles of their inclined faces to correspond to the inclination of the contiguous faces of the tapered end of the center, and indicating means carried by the body and movable relatively thereto, the indicating means being connected to the detecting member to receive movement therefrom, substantially as and for the purpose set forth.

4. In an instrument for comparing the relative positions of centers, a body, a movable detecting member supported by the body and having an opening for receiving the tapered end of the spindle, or center, the detecting member having a pivoted engaging part arranged with its axis transversely of said opening, whereby said part engages the tapered end of the spindle, or center, and extends crosswise of the axis thereof, and indicating means operated by the movement of the detecting member, substantially as and for the purpose set forth.

5. In an instrument for comparing the relative positions of centers, a body, a movable detecting member supported by the body and having opposite engaging parts movable relatively to said member and to each other for adjusting said parts to the contour of the centers, and indicating means operated by the movement of the detecting member, substantially as and for the purpose set forth.

6. In an instrument for comparing the relative positions of centers, a body, a detecting member carried by the body and reciprocally movable relatively thereto, spaced apart members carried by the detecting member and movable relatively thereto and independently of each other, opposing surfaces of said members coacting with inclined sides of the tapered end of a center at opposite sides of the longitudinal axis of the center, and indicating means carried by the body and movable relatively thereto, substantially as and for the purpose specified.

7. In an instrument for comparing the relative positions of centers, a body, a movable detecting member supported by the body and having opposite contact parts pivoted to the body, such contact parts having faces inclined to one another and each at one side of the pivotal axis of its part for engaging the tapered end of a center, and indicating means operated by the movement of the detecting member, substantially as and for the purpose described.

8. In an instrument for comparing the relative positions of centers, a body, a movable detecting member supported by the body and having opposite pivoted engaging parts, the axes of the pivots being coincident, and indicating means operated by the movement of the detecting member, substantially as and for the purpose described.

9. In an instrument for comparing the relative positions of centers, a movable detecting member supported by the body and engaging parts pivotally supported by said member, said parts having opposing contact faces arranged to conform to the tapered end of a center, and indicating means operated by the movement of the detecting member, substantially as and for the purpose specified.

10. In an instrument for comparing the relative positions of centers, a body, a movable detecting member supported by the body and formed with an opening extending therethrough and having opposite engaging parts pivoted to said member and arranged in said opening, each of said parts consisting of opposing pivots having contact-faces between the pivots, the axes of said opposite engaging parts being coincident, and indicating means operated by the movement of the detecting member, substantially as and for the purpose set forth.

11. In an instrument for comparing the relative positions of centers, a body, a movable detecting member supported thereby, an indicator actuated by the movement of the detecting member, a part movable about an axis, said part being connected to the indicator, a part coacting with the former part and connected to the detecting member, and a spring pressing said parts together and frictionally engaging one of said parts, substantially as and for the purpose set forth.

12. In an instrument for comparing the relative positions of centers, a body, a movable detecting member supported thereby, an indicator actuated by the movement of the detecting member, a rotatable part connected to the indicator, a part coacting with the rotatable part to rotate the same and connected to the detecting member, a V shape bearing for the axle of the rotatable part, and a spring for pressing said parts together to hold the rotatable part with its axle in the bearing, substantially as and for the purpose described.

In testimony whereof, I have hereunto signed my name in the presence of two attesting witnesses, at Fulton, in the county of Oswego, in the State of New York, this 3rd day of June, 1912.

NATHEN A. LOCKE.

Witnesses:
 HARRY M. O'BRIEN,
 ROBT. J. PENDERGAST.

Copies of this patent may be obtained for five cents each, by addressing the "Commissioner of Patents, Washington, D. C."